United States Patent [19]

Molina

[11] Patent Number: 4,557,650
[45] Date of Patent: Dec. 10, 1985

[54] FASTENER RETENTION WITH IMPROVED FATIGUE LIFE

[75] Inventor: Jorge W. Molina, Torrance, Calif.

[73] Assignee: Deutsch Fastener Corp., Lakewood, Calif.

[21] Appl. No.: 563,591

[22] Filed: Dec. 20, 1983

[51] Int. Cl.[4] ............................................. F16B 37/04
[52] U.S. Cl. ...................................... 411/108; 411/180
[58] Field of Search ................ 411/108, 103, 83, 105, 411/106, 107, 111, 113, 177, 179, 180, 181, 183

[56] References Cited

U.S. PATENT DOCUMENTS

| Re. 27,143 | 6/1971 | Breed et al. | 151/41.73 |
|---|---|---|---|
| 1,686,468 | 12/1923 | Roberts et al. | |
| 1,765,614 | 1/1928 | roberts et al. | |
| 2,307,080 | 1/1943 | Schaefer | 296/30 |
| 2,490,594 | 7/1943 | Madden | |
| 3,079,970 | 3/1963 | Barry | 411/113 |
| 3,174,523 | 3/1965 | Hult | 411/103 |
| 3,399,705 | 9/1968 | Breed et al. | 151/41.72 |
| 3,695,324 | 10/1972 | Gulistan | 151/41.74 |
| 4,012,884 | 3/1977 | Pagel | 403/408 |
| 4,046,181 | 9/1977 | Barnsdale | 411/180 |
| 4,097,168 | 6/1978 | Pagel | 403/388 |
| 4,186,787 | 2/1980 | Husain | 411/183 |
| 4,227,561 | 10/1980 | Molina | 411/103 |

OTHER PUBLICATIONS

"We Broke a Dozen Screws, but we couldn't Make this Sheet Metal Insert Spin in its Hole!" 3/1963, Southco/Lion.

Primary Examiner—Robert L. Wolfe
Assistant Examiner—Adrian H. Whitcomb, Jr.
Attorney, Agent, or Firm—Gausewitz, Carr & Rothenberg

[57] ABSTRACT

This invention provides improved fatigue life for a fastener having a sleeve associated with a basket and extending through an opening in a workpiece. The sleeve has curved lobes that penetrate the workpiece to prevent rotation, the lobes having inclined leading edges, and inclined abutment surfaces at the inner ends of their roots that compress the displaced material of the workpiece around the entrance to the opening.

11 Claims, 6 Drawing Figures

FASTENER RETENTION WITH IMPROVED FATIGUE LIFE

BACKGROUND OF THE INVENTION

The fastener of U.S. Pat. No. 3,695,324 has been used successfully for several years offering several advantages over conventional nutplates. The fastener assembly is held to the workpiece by upsetting the end of a tubular member to provide an attaching flange. This makes installation easier and quicker than conventional designs which use two rivets to hold the fastener in place, and requires forming only one opening in the workpiece. The fastener also allows for removal and replacement of the nut of the assembly in the event of damage to that element.

However, the fastener of U.S. Pat. No. 3,695,324 has met with objections in some installations. These center around the use of the straight knurl on the periphery of the sleeve which becomes embedded in the workpiece to prevent rotation of the fastener relative to the workpiece. The knurl can cause stress risers leading to premature fatigue failure. Also, the resistance of the fastener to torque loads imposed upon it is not as great as desired in all instances.

BRIEF DESCRIPTION OF THE INVENTION

The present invention overcomes the difficulties noted above, providing an improved rivetless nutplate that is fatique resistant, and at the same time has improved resistance to torque loads.

In the fastener of this invention, the straight knurl of U.S. Pat. No. 3,695,324 is replaced with rounded lobes, curved both at their crests and at their roots, which do not cause stress concentrations when embedded in the workpiece. Tapered surfaces at the ends of the lobes facilitates their entry into the workpiece so that installation forces are not excessive.

At the inner ends of the lobes are additional inclined surfaces which act as abutments that react against the material displaced axially outwardly from the edge of the opening as the sleeve is forced into it. These inner end surfaces compress the workpiece material back down against the surface of the workpiece, compacting it at that area and improving fatigue resistance. This also provides a tighter force around the lobes to improve the torque resistance of the fastener. The inclined surfaces at the inner ends of the lobes terminate within the outer surface of the basket portion of the fastener which bears against the workpiece. The result is a clearance which assures that the fastener will not become locked through engagement of the inclined abutment surfaces and the displaced material of the workpiece before being inserted all the way into the opening in the workpiece.

DETAILED DESCRIPTION OF THE INVENTION

Figure 1:
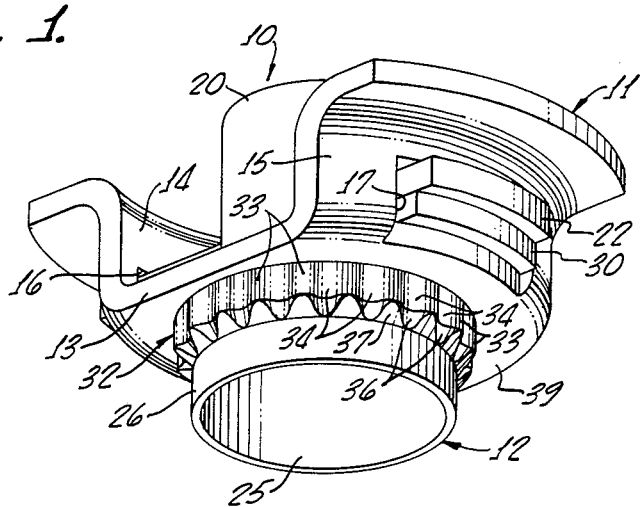
FIG. 1 is a perspective view of the fastener of this invention.
Figure 2:
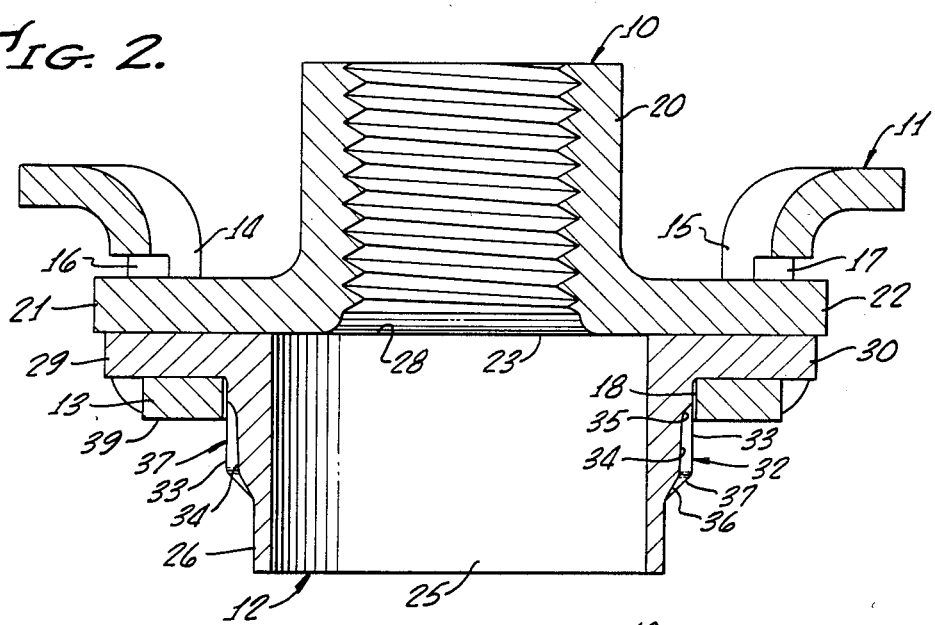
FIG. 2 is an enlarged longitudinal sectional view of the fastener.

The fastener of this invention includes a nut 10, basket 11, and sleeve 12 for attaching the assembly to a workpiece. The basket 11 is generally U-shaped in side elevation, including a bottom wall 13 and opposed upstanding sidewalls 14 and 15. The latter elements project outwardly at their upper ends. Slots 16 and 17 extend through the sidewalls 14 and 15, and a relatively large circular opening 18 is formed at the center of the bottom wall 13. The basket 11 preferably is made of resilient material so that the sidewalls 14 and 15 can be deflected to permit the nut 10 to be removed and replaced.

The nut 10 includes a threaded barrel 20 and flat tabs 21 and 22 that extend radially outwardly in opposite directions from one end 23 of the barrel. The tabs 21 and 22 fit within the slots 16 and 17 in the sidewalls 14 and 15 of the basket 11. This restrains the nut 10 against substantial movement relative to the basket 11. However, the barrel 20 is spaced inwardly from the sidewalls 14 and 15, and there is a clearance around the tabs 21 and 22 at the slots 16 and 17, which allows the nut 10 limited floating movement relative to the basket 11.

The sleeve 12 has a cylindrical bore 25 of constant diameter extending from one end to the other. The cylindrical wall 26 of the sleeve, extending inwardly from the outer end 27, is relatively thin and deflectable for forming a flange when the fastener is installed. The remainder of the sleeve has a thicker wall. At the inner end 28, the sleeve 12 includes flat oppositely extending tabs 29 and 30 which have the effect of a head overlying the bottom wall 13 of the basket 11 and projecting through the slots 16 and 17 in the sidewalls 14 and 15. This positions the sleeve 12 beneath the nut 10 and secures the sleeve and basket 11 together. Adjacent the tabs 29 and 30, the sleeve 12 fits relatively closely within the opening 18 in the bottom wall 13 of the basket 11.

The sleeve 12, next to the tabs 29 and 30, has a relatively thick wall and a short cylindrical exterior surface 31. Beyond this surface are rounded lobes 32 having crests 33 and roots 34 which merge smoothly and are cylindrical segments. At their inner ends, the roots 34 of the lobes begin with concave curved abutment surfaces 35 that incline toward the sleeve axis and toward the outer end of the sleeve from the sleeve surface 31. Beyond the inclined surfaces 35, the roots 34 taper toward the axis of the sleeve at a shallow angle such as 3°. At their outer ends, the roots 34 connect to surfaces 36 that incline inwardly at a more steep angle to the thin-walled portion 26. The inclination of these end surfaces preferably is in the range of 15° to 35° relative to the axis of the sleeve, typically being 30°.

The crests 33 of the lobes form an extension of the cylindrical surface 31 of the sleeve and are parallel to the axis of the sleeve. At their outer ends, the crests incline inwardly along surfaces 37 to the thin-walled part 26. The surfaces 37 are more steeply inclined than the root forward end surface 36.

When the sleeve 12 is assembled with the other components of the fastener, the beginning of the root surface 35 at its juncture with the sleeve surface 31 is spaced inwardly of the outer flat surface 39 of the bottom wall 13 of the basket 11.

Figure 3:
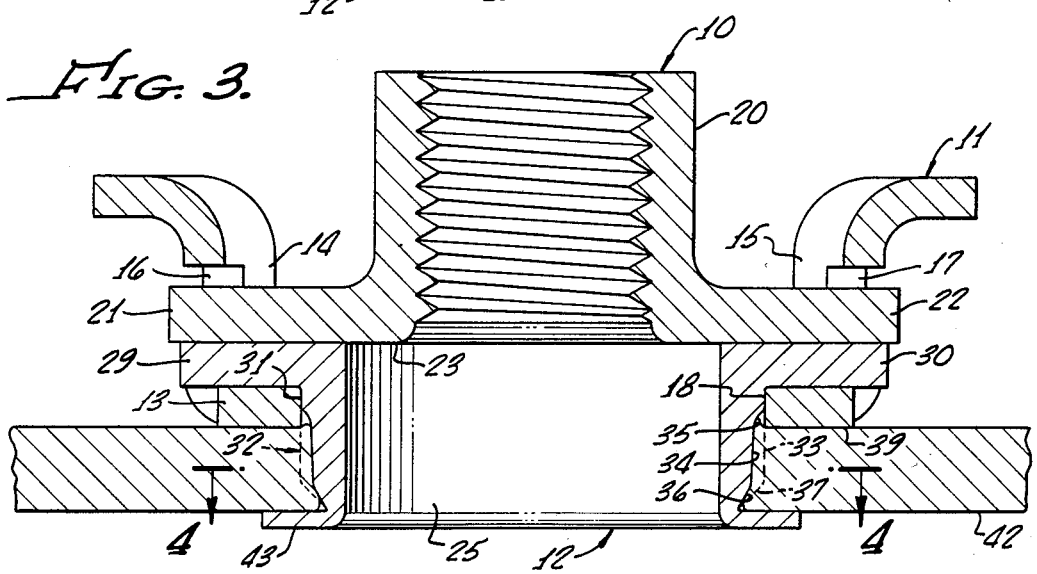
FIG. 3 is a view similar to FIG. 1 showing the fastener installed in a workpiece.
Figure 4:
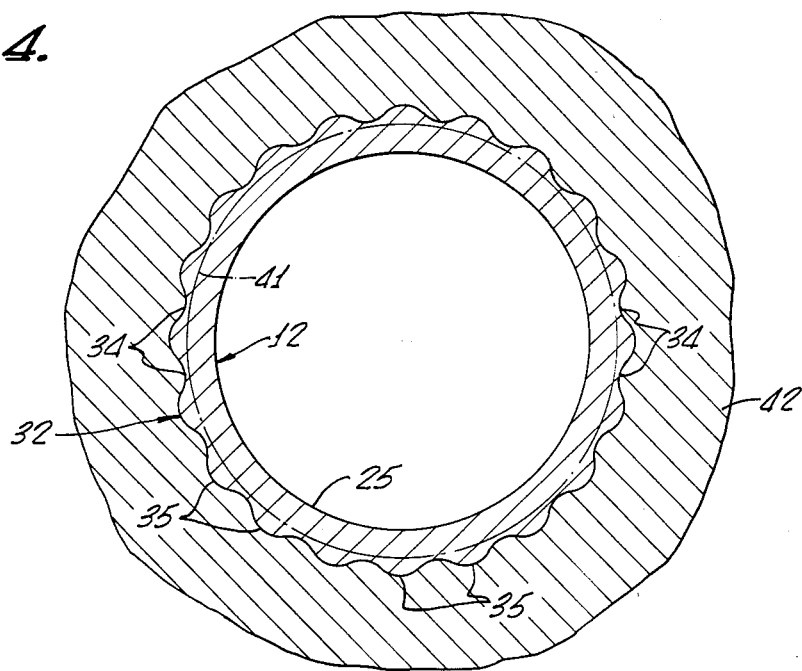
FIG. 4 is a transverse sectional view taken along line 4—4 of FIG. 3.
Figure 5:
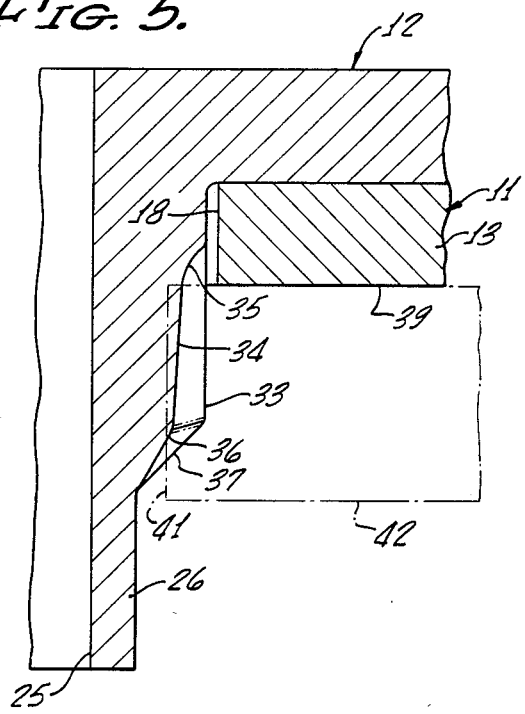
FIG. 5 is an enlarged fragmentary sectional view illustrating the relationship of the lobes and associated components to the workpiece.

The sleeve 12 of FIGS. 1 through 5 is designed for an interference fit in the opening 41 in a panel 42. Accordingly, the opening 41 has a diameter greater than than of the thin-walled portion 26 of the sleeve 12, but less than that of the sleeve at the roots 34 of the lobes 32 at their outer ends. When the sleeve 12 is forced into the opening 41, the material of the panel 41 is displaced first by the leading edges 36 and 37 of the roots and crests of the lobes, and then by the lobes as they progress into the workpiece. The inclination of the root surfaces 36 is important in assuring that the insertion force will not be excessive. Also, the taper on the root surfaces 34 helps displace the material of the panel as the sleeve 12 enters the opening 41. After the sleeve has been forced into the opening 41 to the position illustrated, where the lower surface 39 of the central wall 13 of the basket 11 engages the surface of the workpiece, the thin-walled portion 26 is flared outwardly to form a flange 43, as shown in FIG. 3, which holds the fastener to the panel 42.

The rounded lobes 32 compress the material of the panel 42 around the opening 41, resulting in a desirable prestressed condition which improves fatigue performance. The effect is enhanced significantly by the inclined surfaces 35 at the inner ends of the lobes. As the lobes enter the material of the panel 42, some of the material is displaced in an axial direction, upwardly around the entry end of the opening 41. This material is confined by the surfaces 35 and largely pressed back down toward the upper surface of the panel 42. This results in greater compression of the material of the panel 42 and a higher prestressed loading. In addition, the surfaces 35 help provide a relatively smooth contour around where the lobes enter the panel 42. This assists in avoiding stress risers. The compression of the panel material by the surfaces 35 also forces the material of the panel more tightly around the lobes and increases the torque resistance of the sleeve 12.

It is important that at least the beginning portions of the surfaces 35 be recessed slightly from the bottom surface 39 of the wall 13 of the basket 11. This provides a clearance at the surface 35 so that these surfaces will not unduly restrict the entry of the lobes into the material of the panel 42. As a result of the clearance, the sleeve 12 can move all the way into the opening 41 and will not be prevented from full movement by the engagement of the surface 35 with the material displaced axially outwardly at the entrance to the opening 41. At the same time, the surfaces will perform their function of confining the panel material at the entrance end of the opening.

Figure 6:
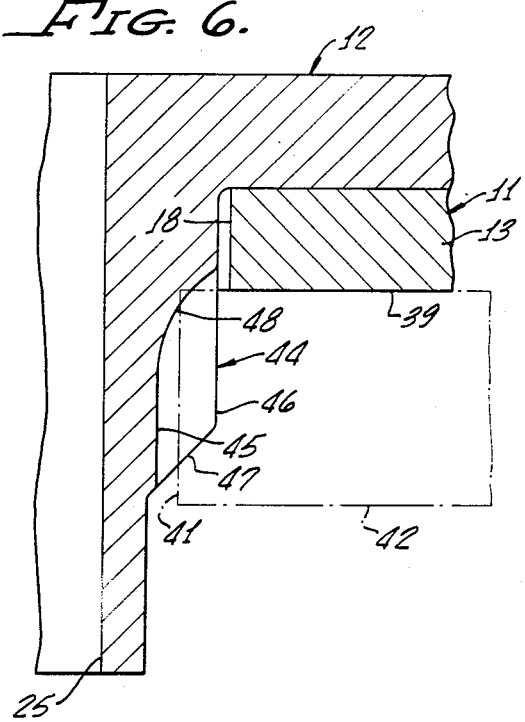
FIG. 6 is a view similar to FIG. 5 showing a modified form of the invention.

In the embodiment of FIG. 6, the sleeve 12 is modified for installations where it is not desired to provide an interference fit between the sleeve and the workpiece. In this instance, the lobes 44 are deeper, so that their roots 45 extend almost to the level of the surface of the thin-walled portion 26. As a result, the roots 45 are spaced from the wall of the opening 41 in the panel 42 when the sleeve is installed, and only the outer portions of the crests 46 of the lobes penetrate the panel. The leading edges 47 of the lobes 44 incline toward the sleeve axis and the outer end of the sleeve, being similar in this respect to the surfaces 37 of the previously described embodiment. The curved surfaces 48 at the inner ends of the roots 45 are longer than the surfaces 35, extending well into the area that enters the panel 42. However, the inner ends of the surfaces 48 remain recessed inwardly of the bottom surface 39 of the central wall 13 of the basket 11. Hence, the surfaces 48 can perform as did the surfaces 35 in the previously described embodiment. That is to say, the surfaces 48 compress the displaced material of the panel 42 at the entry end, again enhancing the compression in the workpiece around the lobes making the material smooth at the entrance to avoid stress risers and improving the torque-out of the sleeve.

The foregoing detailed description is to be clearly understood as given by way of illustration and example only, the spirit and scope of this invention being limited solely by the appended claims.

I claim:

1. In combination with a fastener having a member engageable with one side of a workpiece adjacent one end of an opening through said workpiece, said member having an opening therethrough, and a sleeve extending through said opening in said member, said sleeve having a bendable outer end portion for being bent over the opposite side of the workpiece for forming a flange for holding said fastener to said workpiece, a fatigue resistant torque retention arrangement comprising a plurality of axial lobes on said sleeve inwardly of said outer end portion of said sleeve,
    said sleeve at the crests of said lobes having a greater outside diameter than at said outer end portion of said sleeve,
and an abutment surface at the inner end of the root of each of said lobes,
    said abutment surface extending from adjacent the crests of said lobes to said root, and tapering inwardly toward said outer end position of said sleeve,
    at least a portion of said abutment surface being within said opening in said member, whereby said abutment surface is spaced from the surface of a workpiece engaged by said member, yet can compress material of said workpiece displaced by said lobes upon entry of said lobes into said workpiece.

2. A device as recited in claim 1 in which said crests and said roots of said lobes are rounded.

3. A device as claimed in claim 1 in which said abutment surfaces are rounded and concave.

4. A device as recited in claim 1 including inclined surfaces at the outer ends of said lobes connecting the crests of said lobes to the outer end portion of said sleeve, said inclined surfaces tapering inwardly toward the axis of said sleeve and toward said outer end portion of said sleeve.

5. In combination with a fastener having a basket member having one side engageable with the surface of a workpiece adjacent one end of an opening through said workpiece, said member having an opening therethrough, a nut retained by said basket member, and a sleeve extending through said opening in said basket member and being adapted to extend through said opening in said workpiece, said sleeve having a bendable outer end portion for being bent over the surface of said workpiece at the opposite end of said opening through said workpiece for forming a flange for holding said fastener to said workpiece, said sleeve having head means at its opposite end, a fatigue resistant torque retention arrangement comprising a cylindrical exterior surface on the exterior of said sleeve adjacent said head means thereof, a plurality of rounded axial lobes on said sleeve inwardly of said outer end portion of said sleeve, the crests of said lobes connecting to said cylindrical exterior surface, said sleeve at the crests of said lobes having a greater outside diameter than at said outer end portion of said sleeve and an outside diameter substantially the same as that of said cylindrical surface, and an abutment surface at the inner end of the root of each of said lobes, said abutment surface inclining toward the axis of said sleeve and toward said outer end portion thereof, said abutment surface extending from said cylindrical exterior surface adjacent the crests of said lobes to said root, and being spaced axially from said head means, at least a portion of said abutment surface being within said opening in said member, whereby said abutment surface is spaced from the surface of a workpiece engaged by said member, yet can compress material of said workpiece displaced by said lobes upon entry of said lobes into said workpiece, said lobes having outer end surfaces inclined toward the axis of said sleeve and the outer end thereof.

6. A device as claimed in claim 5 in which said abutment surfaces are curved and concave.

7. A device as recited in claim 5 in which said outer end surfaces include portions extending from the roots of said lobes to said outer end portion and inclined at an angle of between about 15° to about 35° with respect to the axis of said sleeve.

8. A device as recited in claim 7 in which said angle of said portions of said outer end surfaces is approximately 30°.

9. A device as recited in claim 5 in which said roots taper outwardly at a shallow angle relative to the axis of said sleeve from said abutment surfaces to said outer end surfaces.

10. A device as recited in claim 9 in which said roots so taper at an angle of approximately 3° relative to the axis of said sleeve.

11. A device as recited in claim 5 in which said lobes are defined by cylindrical segments.

* * * * *

UNITED STATES PATENT AND TRADEMARK OFFICE
CERTIFICATE OF CORRECTION

PATENT NO. : 4,557,650
DATED : Dec. 10, 1985
INVENTOR(S) : Jorge W. Molina

It is certified that error appears in the above-identified patent and that said Letters Patent is hereby corrected as shown below:

Claim 1, column 4, line 33, "position" should read ---portion---.

Signed and Sealed this

Third Day of June 1986

[SEAL]

Attest:

DONALD J. QUIGG

Attesting Officer

Commissioner of Patents and Trademarks